UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

REACTION PRODUCT OF HEXAMETHYLENETETRAMIN AND PHENOLIC BODIES AND METHOD OF MAKING SAME.

1,187,230.

Specification of Letters Patent. Patented June 13, 1916.

No Drawing. Application filed December 13, 1910. Serial No. 597,072.

*To all whom it may concern:*

Be it known that I, LEO H. BAEKELAND, a citizen of the United States, residing at Yonkers, in the county of Westchester and State of New York, have invented certain new and useful Improvements in Reaction Products of Hexamethylenetetramin and Phenolic Bodies and Methods of Making Same, of which the following is a specification.

In my prior Patent No. 942,809, granted December 7, 1909, I have described and claimed a method of preparing condensation products consisting in reacting on a phenolic body in presence of a base serving as a condensing agent. I have further pointed out in the said patent that amins and amids, and in general all derivatives of the type $NH_3$ which possess basic properties are well adapted for use as condensing agents. I have also in said patent explained that ammonia, aqueous or anhydrous, may be employed, and that it may by reaction with the formaldehyde, give rise to hexamethylenetetramin $(CH_2)_6N_4$, which is to be regarded as the effective or active basic condensing agent.

I have found that under certain conditions it is advantageous to employ previously prepared hexamethylenetetramin, or its phenolic addition products, or the chemical equivalents of these bodies, as for example mixtures of formaldehyde and ammonia in substantially the proportions required to yield hexamethylenetetramin; and that such use presents particular advantages for the preparation of certain transparent or translucent, compact products having somewhat the appearance of amber, but readily distinguishable therefrom by certain chemical characteristics, as hereinafter more fully described.

It is known that hexamethylenetetramin in presence of certain other bodies decomposes by heat. It is known also that hexamethylenetetramin forms combinations with phenol (see Beilstein's *Handbuch der Organischen Chemie*, 3rd edition, Vol. II., page 651); such compounds, if heated without special precautions, decompose with the disengagement of ammonia and other gaseous products, yielding a spongy mass of a solid material. I have found that if the latter reaction be carried out under certain special conditions, it becomes possible to obtain hard and infusible products of technical or commercial value. Products may thus be obtained which in appearance are very similar to amber, and which may be employed for purposes similar to those for which amber is used, as well as for other technical applications. I find, for example, that if I boil together one part of hexamethylenetetramin with four parts by weight of phenol, and subject the product to further heating, I obtain a yellow, transparent, amber-like mass.

A compact mass will be obtained if the heating is effected under pressure, or if the heat be applied gradually, so that the ammonia set free is retained in the mass. This result is facilitated by the presence of some excess of phenol above the proportion required to convert the hexamethylenetetramin into hexamethylenetetramintriphenol, or an excess of the homologues of phenol or of other substances which may enter into a solid solution in the mass and thereby facilitate the retention of the ammonia.

The proportions above mentioned may be modified according to the purposes in view; for instance, the amount of phenol or other phenolic body may be increased or diminished, and even if an excess of one or the other of the reagents be used, such excess may to a certain extent be afterward eliminated, either by evaporation or by other suitable means.

As above stated, phenolic bodies other than phenol may be used, as for example the homologues of phenol; and the hexamethylenetetramin may be replaced by any chemical bodies or mixtures of chemical bodies which are equivalent to hexamethylenetetramin in their chemical action for this process.

Inasmuch as the ultimate products of this reaction are similar to, if not identical with, certain insoluble, infusible condensation products of phenols and formaldehyde prepared under special conditions, it might be anticipated that with the mixture or combination of hexamethylenetetramin and phenols, a certain amount of formaldehyde, or the polymers of formaldehyde, could be used either to modify the technical qualities of the final product or to regulate the chemical process; and such addition is found advantageous in certain cases.

Instead of using hexamethylenetetramin in the pure or fully prepared condition, I may use mixtures of formaldehyde and ammonia, made directly or indirectly: for instance, I may add ammonia to formaldehyde in suitable proportions, then add the phenolic body; or I may reverse the order of mixing, adding ammonia to the phenolic body and then adding formaldehyde. The technical effects are identical, which ever procedure be used.

Instead of formaldehyde, I may use substances, as for example $CH_2 Cl_2$, which by reaction with ammonia yield hexamethylenetetramin. Instead of ammonia, I may use such ammonium salts, as for instance carbonate of ammonium, or such chemicals, as for instance carbamid, as ultimately may react with liberation of ammonia and are therefore chemically equivalent to ammonia in their action. Or again, instead of phenols, I may use, either in part or solely, an alcohol-phenol, such for example as oxybenzyl alcohol; or I may use any partial anhydrids of alcohol-phenols alone with hexamethylenetetramin, or its equivalents, or in conjunction with or addition to phenols and formaldehyde.

As is well understood in the art, such partial anhydrids of phenol-alcohols are fusible, resinous bodies, or phenolic condensation products, otherwise known as saliretins or saliretin products; (see Beilstein *Handbuch der Organischen Chemie*, third edition, Vol. II, page 1109, article "Saliretins"; also French Patent 350,180, British Patent 15,517 of 1905, and German Patent 189,262 to Fabriques de Produits de Chimie Organique de Laire, etc.).

After indicating as above some of the different ways in which my process may be modified by substituting chemical equivalents, I shall proceed to describe two concrete examples whereby the desired product may be obtained:

Example I: 25 grams hexamethylenetetramin, 110 grams phenol, 80 grams water. Boil together for about 50 minutes, then evaporate, and heat further until the product becomes hard.

Example II: 40 grams hexamethylenetetramintriphenol, 85 grams phenol, 38 grams formaldehyde (40% solution). Boil together for ten minutes, then evaporate to drive off water and other gaseous products, and then harden by further heating.

The final heating may be rendered more effective by the use of increased pressures, which permits the use of high temperatures.

For certain applications it may be found advantageous to add foreign substances to this material, such additions comprising either bodies which are insoluble in the mixture and act as fillers, as for instance fibrous or pulverulent materials as asbestos, wood fiber, lampblack, iron oxid, etc., or such substances as resins, camphor, naphthalene, asphaltum, anthracene, etc., or other similar substances may be added which may form mixtures or solid solutions with the product. The addition of any such bodies as mentioned above may be useful for modifying specific properties of the material. In the same way, suitable catalytic agents or condensing agents as for example a small proportion of caustic soda may be added for the purpose of facilitating the reaction.

In its initial stages, and before the final application of heat which produces the maximum hardening, the product formed as above may for certain purposes, as for instance the preparation of varnishes or paints, be dissolved in alcohol or other appropriate solvents; and these solvents can be removed by evaporation before the substance is submitted to the final heating for the purpose of hardening it.

In its final form, the reaction product is a poor conductor of heat and electricity; it is vitreous in character and has usually a yellowish color, which may however vary according to the purity of the materials, the temperature to which it has been subjected or according to its degree of oxidation. The product may be obtained in transparent, translucent or opaque masses according to the conditions of operation. Thus the presence in the mass of residual water tends to render it opaque, whereas the presence of an excess of a phenolic body or of other substances capable of forming solid solutions tends to the formation of transparent products. It is insoluble in ethyl alcohol, benzol, toluol, carbon disulfid and chloroform. It does not melt if heated, but heated at sufficiently high temperatures, it is destroyed and chars without melting. Crushed or scraped, sawed or filed, or gently heated, it denotes the presence in the interior of the mass of uncombined or loosely combined ammonia. Analysis shows the presence of total ammonia which may attain three to six per cent. or somewhat more by weight of the product; the uncombined or loosely combined ammonia may be eliminated by sufficient heating. Submitted to dry distillation, it leaves a carbonized residue, and yields a distillate containing some water, some ammonia, some phenol or homologues of phenol, and various other substances.

The amber-like appearance of the product is characteristic of condensation products produced in presence of ammonia, and the product is easily distinguished from those prepared with most other condensing agents of a basic character. For example, potash tends to yield products having a purplish shade, etc.

The term "hexamethylenetetramin", as employed in the claims, is to be understood as including the chemical equivalents thereof, as for example homologues of hexamethylenetetramin, or mixtures of ammonia and formaldehyde, or other substances or mixtures which may engender hexamethylenetetramin and are therefore equivalent thereto. Similarly, the word "phenols" is to be understood as including phenol, its homologues, other phenolic bodies having an equivalent action or mixtures thereof. The expression "uncombined ammonia" is to be understood as referring to ammonia which either exists in a free state in the product or is so loosely combined therein that it may be expelled by simple application of heat without destructive distillation of the product, or dissolved out by treating the pulverized product with water.

I claim:

1. The method of producing compact yellow products having somewhat the appearance of amber and containing uncombined ammonia, which consists in reacting with phenols on hexamethylenetetramin under the influence of heat, expelling a portion only of the liberated ammonia, and transforming the reaction product into a compact infusible body containing the residual ammonia.

2. The method of producing compact yellow products having somewhat the appearance of amber and containing uncombined ammonia, which consists in reacting with phenols on hexamethylenetetramin under the influence of heat, expelling a portion only of the liberated ammonia, and transforming the reaction product by the combined action of heat and pressure into a compact infusible body containing the residual ammonia.

3. The method of producing hard and infusible phenolic condensation products, which consists in reacting on a phenolic body with hexamethylenetetramin in presence of water, heating to expel water and ammonia, and then hardening the reaction product.

4. The method of producing hard and infusible phenolic condensation products, which consists in reacting on a phenolic body with hexamethylenetetramin in presence of water, heating to expel water and ammonia, and then hardening the reaction product by the combined action of heat and pressure.

5. The method of producing hard and infusible phenolic condensation products, which consists in reacting on a phenolic body with hexamethylenetetramin in presence of water, heating to expel water and a portion only of the ammonia and then hardening the reaction product containing the residual ammonia.

6. The method of producing hard and infusible phenolic condensation products, which consists in reacting simultaneously on a phenolic body with hexamethylenetetramin and formaldehyde in presence of water, heating to expel water and ammonia, and then hardening the reaction product.

7. The method of producing hard and infusible phenolic condensation products, which consists in reacting simultaneously on a phenolic body with hexamethylenetetramin and formaldehyde in presence of water, heating to expel water and a portion only of the ammonia, and then hardening the reaction product containing the residual ammonia.

8. As a new composition of matter, a hard, compact, homogeneous and infusible phenolic condensation product characterized by its amber-like color, and by the presence therein of ammonia in proportion of at least three per cent. by weight of the product.

9. As a new composition of matter, a hard, compact, homogeneous and infusible phenolic condensation product characterized by its amber-like color, and by the presence therein of ammonia in excess of one-fifth of the equimolecular proportion of the phenolic body used.

In testimony whereof, I affix my signature in presence of two witnesses.

LEO H. BAEKELAND.

Witnesses:
 HERBERT S. MAY,
 W. S. GORDON, Jr.